United States Patent [19]

Miyazaki

[11] Patent Number: 5,613,646
[45] Date of Patent: Mar. 25, 1997

[54] FISHING DOUBLE-BEARING TYPE REEL WITH PLAY-REDUCTING CLUTCH MECHANISM

[75] Inventor: Takeo Miyazaki, Kodaira, Japan

[73] Assignee: Daiwa Seiko, Inc., Tokyo, Japan

[21] Appl. No.: 501,468

[22] Filed: Jul. 12, 1995

[30] Foreign Application Priority Data

Jul. 13, 1994 [JP] Japan .................. 6-009546

[51] Int. Cl.⁶ .................. A01K 89/015
[52] U.S. Cl. .................. 242/260
[58] Field of Search .................. 242/259, 260, 242/261, 262

[56] References Cited

U.S. PATENT DOCUMENTS

| | | | |
|---|---|---|---|
| 2,130,281 | 9/1938 | Case | 242/261 |
| 3,812,940 | 5/1974 | Svensson | 242/260 |
| 4,579,296 | 1/1986 | Karlsson et al. | 242/261 |
| 4,796,831 | 1/1989 | Sheppard | 242/262 |
| 5,123,609 | 6/1992 | Noda | 242/261 |
| 5,205,511 | 4/1993 | Morimoto | 242/261 |
| 5,275,352 | 1/1994 | Sato | 242/261 |
| 5,299,758 | 1/1994 | Sato | 242/261 |

FOREIGN PATENT DOCUMENTS

| | | |
|---|---|---|
| 57-158372 | 3/1956 | Japan . |
| 60-103804 | 4/1985 | Japan . |

*Primary Examiner*—Katherine Matecki
*Attorney, Agent, or Firm*—Longacre & White

[57] ABSTRACT

The invention relates to a fishing double-bearing type reel having a clutch mechanism which controls the engagement of a spool shaft thereby to switch the fishing-line take-up state and the fishing-line let-out state of the reel. In a fishing double-bearing type reel, a supporting shaft is provided coaxially with respect to a spool shaft on which a spool is mounted, and a pinion, which is rotated in association with the rotation of the handle, is mounted on the supporting shaft, and a rod-shaped engaging piece is provided on the pinion in such a manner that it is perpendicular to the axis, and is engaged with an recess formed in the end portion of the spool shaft. The engaging region where the rod-shaped engaging piece and the recess are engaged with each other is located as close to the common axis of the spool shaft and the supporting shaft as possible.

11 Claims, 4 Drawing Sheets

FISHING DOUBLE-BEARING TYPE REEL WITH PLAY-REDUCTING CLUTCH MECHANISM

BACKGROUND OF THE INVENTION

This invention relates to an improvement of a clutch mechanism which is adapted to switch a fishing-line take-up state and a fishing-line let-out state of the spool of a fishing double-bearing type reel over to each other.

In general, the clutch mechanism of a fishing double-bearing type reel which is adapted to switch the fishing-line take-up state and the fishing-line let-out state of the spool is designed as follows: A spool shaft, on which a spool is mounted, has a chamfered segmental clutch coupling section; while a pinion which is movably mounted on the spool shaft and is rotated in association with the rotation of the handle has a slit-shaped engaging section which is engaged with the clutch coupling section, so that the pinion is moved into and out of engagement with the spool shaft. However, when the fishing line is let out of the reel, the clutch mechanism suffers from the following problem: That is, in this case, since the pinion is engaged with the spool shaft which is rotated together with the spool, the spool shaft is high in rotation resistance, as a result of which the length of the fishing line which is let out of the reel, namely, the casting distance of the fishing line is decreased as much. In order to eliminate this difficulty, Japanese Utility Model Kokoku Publication No. Sho. 60-10380 and Japanese Utility Model Kokai Publication No. Sho. 57-158372 have disclosed a method of supporting the pinion with a supporting shaft which is provided in addition to the spool shaft, to decrease the rotation resistance of the spool shaft in letting the fishing line out of the reel.

However, the method involves the following two serious problems:

One of the problems is as follows: The engaging section of the pinion is engaged with the outside of the chamfered segmental clutch coupling section of the spool shaft, and therefore the width of the slit-shaped engaging section which are confronted with each other is 3 to 4 mm even in a middle or small reel such as a bait casting reel, and 5 to 7 mm in a large reel such as a barrel-type reel and a trolling reel. Hence, when the reel is operated to take up the fishing line, the rotary members are liable to play greatly because of the gaps between the clutch coupling section and the slit-shaped engaging section. Accordingly, a fisherman, when feeling a bite, may not able to accurately and quickly perform the hooking operation.

The other problem is as follows: The size of the engaging section of the pinion depends on the diameter of the spool shaft and the limited space in the gear box. On the other hand, in order to make the pinion high in corrosion resistance, machinability, and engagement characteristic, the pinion is, in general, made of copper alloy such as brass and bronze, or aluminum alloy which is lower in mechanical strength than hard steel such as stainless steel. Hence, in the case where the clutch mechanism is operated for a long time repeatedly switching-the fishing-line let-out state of the spool over to the fishing-line take-up state, or the fishing-line winding operation is carried out under a high load, the engaging section of the pinion may be deformed or worn out, thus making it difficult to smoothly and positively operate the clutch mechanism.

SUMMARY OF THE INVENTION

In view of the foregoing, an object of the invention is to provide a fishing double-bearing type reel having a clutch mechanism in which, during the rotation of the reel, the occurrence of play in the clutch engaging section of the spool and the pinion is substantially eliminated, and the spool and the pinion are improved in engaging strength.

The foregoing object of the invention has been achieved by the provision of a fishing double-bearing type reel in which a supporting shaft is provided coaxially with respect to a spool shaft which is rotatably supported by a reel body and has a spool, and a pinion, which is rotated in association with the rotation of a handle, is mounted on the supporting shaft in such a manner that the pinion is axially movable relative to the spool shaft, the pinion being moved into and out of engagement with the end of the spool shaft, in which, according to the invention, a rod-shaped engaging piece is provided on one of the end portions of the spool shaft and the pinion which are confronted with each other, in such a manner that the rod-shaped engaging piece is perpendicular to the axis, and an recess is formed in the other which is engaged with the rod-shaped engaging piece.

The supporting shaft may be supported on the reel body in such a manner that it is axially either movable or not movable. In the case where the supporting shaft is so supported that it is not axially movable, and the pinion is mounted on the supporting shaft in such a manner that it is axially movable, preferably the clutch mechanism is short in axial length. The rod-shaped engaging piece, and the recess which is engaged with the engaging piece relate to each other as follows: In the case where the rod-shaped engaging piece is extended from the pinion, the recess is formed in the spool shaft; whereas in the case where the rod-shaped engaging piece is extended from the spool shaft, the recess is formed in the pinion. The rod-shaped engaging piece is made of a hard steel high in mechanical strength such as stainless steel and hardened, quenched steel, and the pinion is made of a non-ferrous material, such as copper alloy, or brass or bronze, or aluminum alloy, which is high in corrosion resistance and in machinability.

The reel of the invention operates as follows: When the rod-shaped engaging piece (or the recess) of the pinion is engaged with the recess (or the rod-shaped engaging piece) of the spool shaft with the aid of the clutch mechanism, the pinion is coupled to the spool shaft, so that the spool on the spool shaft is placed in the fishing-line take-up state. When the rod-shaped engaging piece (or the recess) of the pinion is disengaged from the recess (or the rod-shaped engaging piece) of the spool shaft with the aid of the clutch mechanism, the pinion is disengaged from the spool shaft, so that the spool on the spool shaft is freely rotatable being placed in the fishing-line let-out state. In the reel of the invention, the engaging region where the rod-shaped engaging piece and the recess are engaged with each other is located as close to the common axis of the spool shaft and the supporting shaft as possible. Hence, when the reel is rotated, the occurrence of play is substantially eliminated which is due to the clearance in the engaging region.

DETAILED DESCRIPTION OF THE PREFERRED EMBODIMENTS

Figure 1:
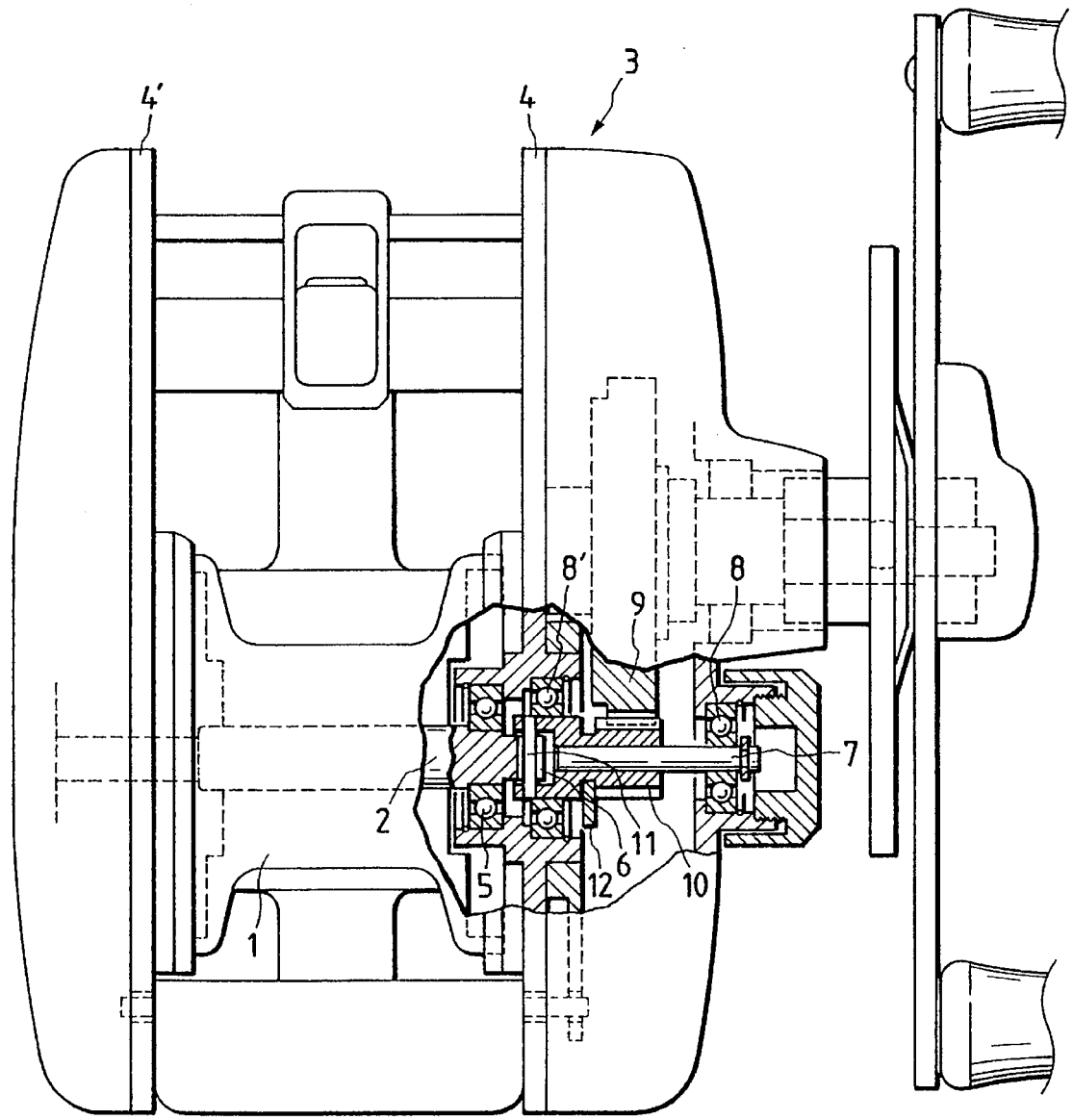
FIG. 1 is a plan view, with parts cut away, showing an example of a fishing double-bearing type reel, which constitutes a first embodiment of the invention.

Preferred embodiments of the invention will be described with reference to the accompanying drawings in which like parts are designated by like reference numerals or characters.

Figure 2:
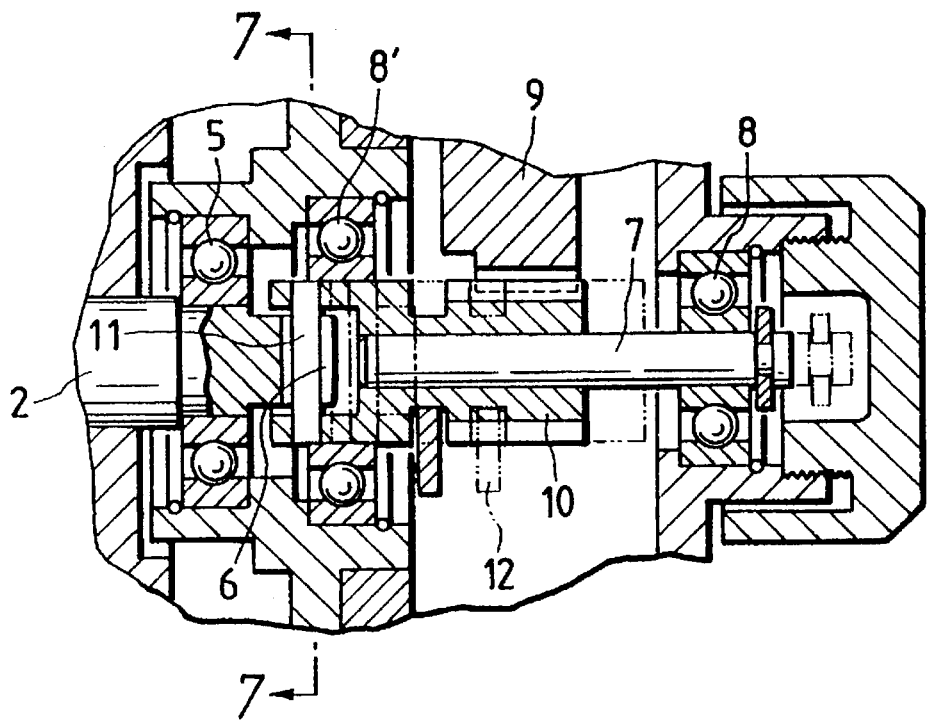
FIG. 2 is a longitudinal sectional front view showing essential components of the reel shown in FIG. 1, for a description of a fishing-reel take-up state of the latter.
Figure 3:
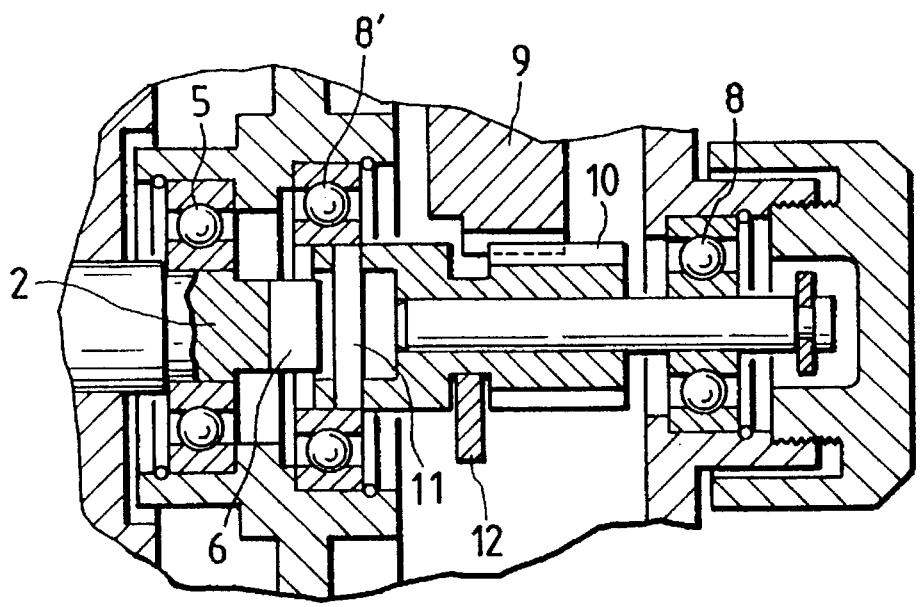
FIG. 3 is a longitudinal sectional front view showing essential components of the reel shown in FIG. 1, for a description of a fishing-reel let-out state of the latter.

An example of a fishing double-bearing type reel, which constitutes a first embodiment of the invention, is as shown in FIGS. 1, 2 and 3. The fishing double-bearing type reel comprises: a reel body 3; a spool shaft 2 made of a material high in mechanical strength such as stainless steel which is rotatably supported through bearings 5 (one of which is shown in the drawings) between reel side boards 4 and 4' of a reel body 3; and a spool 1 fixedly mounted on the spool shaft 2. A narrow-groove-shaped recess 6 is formed in the end portion of the spool shaft 2 on the side of the reel side board 4.

In the reel side board 4, a supporting shaft 7 is supported through a bearing 8 in such a manner that it is coaxial with respect to the spool shaft 2 and is axially movable, and a pinion 10 is fixedly mounted on the supporting shaft 7 in such a manner that it is engaged with a drive gear 9 of a handle shaft and supported through a bearing 8'. A rod-shaped engaging piece 11 is supported on the inner end portion of the pinion 10 in such a manner that it is perpendicular to the supporting shaft 7 and is engaged with the above-described recess 6. The pinion 10 is engaged with a clutch board 12 which is adapted to urge the pinion 10 inwardly. The clutch board 12 is moved right and left by means of a conventional clutch mechanism. As the clutch board 12 is moved in this way, the supporting shaft 7 is slid right and left to move the rod-shaped engaging piece 11 of the pinion 10 into and out of engagement with the recess 6.

The pinion 10 is made of a non-ferrous material high both in corrosion resistance and in machinability such as copper alloy, or brass and bronze, and aluminum alloy. The rod-shaped engaging piece 11 of the pinion 10 is 1 to 2 mm in diameter, and is made of a hard steel material such as stainless steel or hardened steel. The recess 6 is small in width, 1.1 to 2.1 mm. Hence, when the rod-shaped engaging piece 11 of the pinion 10 is engaged with the recess 6 of the spool shaft 2 with the supporting shaft 7 slid inwardly as shown in FIG. 2, the spool 1 is placed in the fishing-line take-up state; and when the rod-shaped engaging piece 11 of the pinion 10 is disengaged from the recess 6 of the spool shaft 2 with the supporting shaft 7 moved outwardly as shown in FIG. 3, the spool shaft 2 is made freely rotatable; that is, the reel is placed in the fishing-line let-out state.

In addition, reference numeral 10a designates an annular wall of the pinion 10a defining a circular hole into which the end portion of the spool shaft 2 is insertable.

Figure 4:
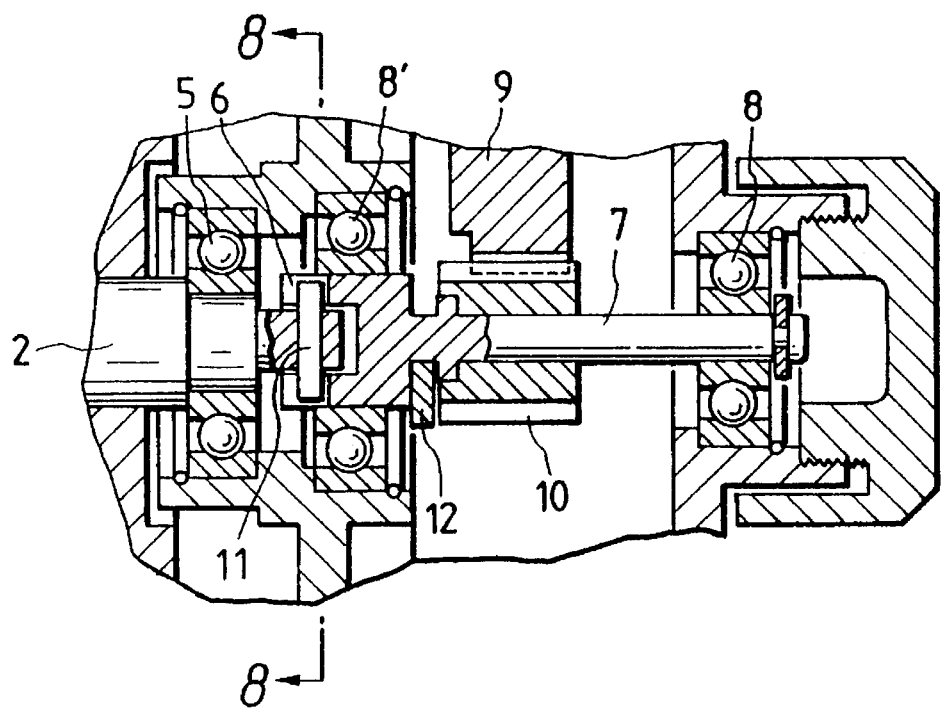
FIG. 4 is a longitudinal sectional front view showing essential components of another example of the fishing double-bearing type reel, which constitutes a second embodiment of the invention.
Figure 5:
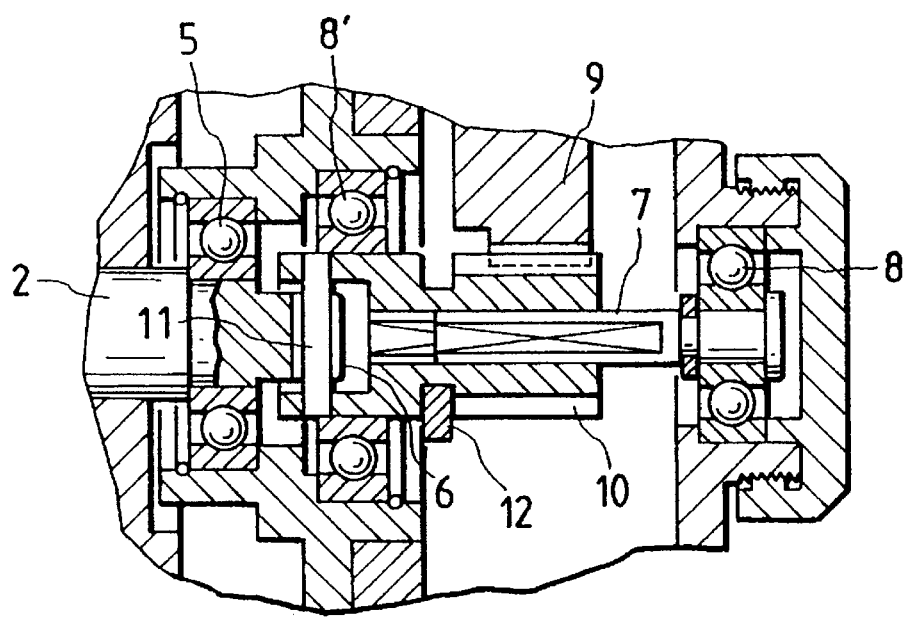
FIG. 5 is a longitudinal sectional front view showing essential components of another example of the fishing double-bearing type reel, which constitutes a third embodiment of the invention.
Figure 6:
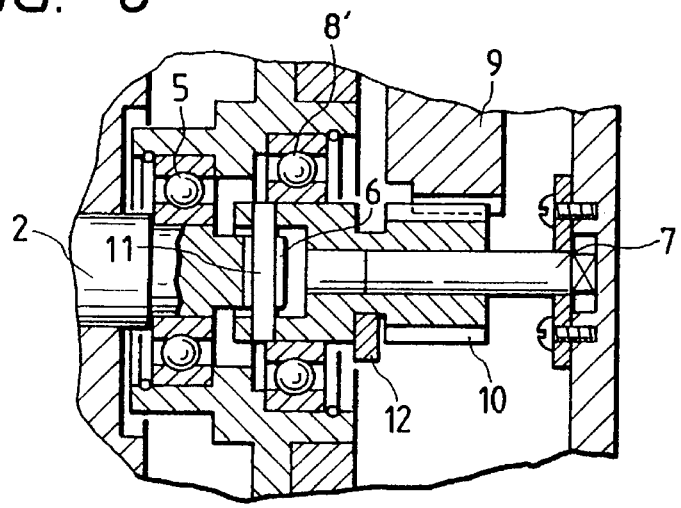
FIG. 6 is a longitudinal sectional front view showing essential components of another example of the fishing double-bearing type reel, which constitutes a fourth embodiment of the invention.
Figure 7:
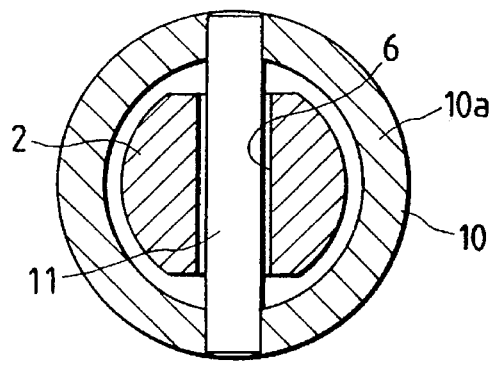
FIG. 7 is a sectional view taken along line 7—7 in FIG. 2.
Figure 8:
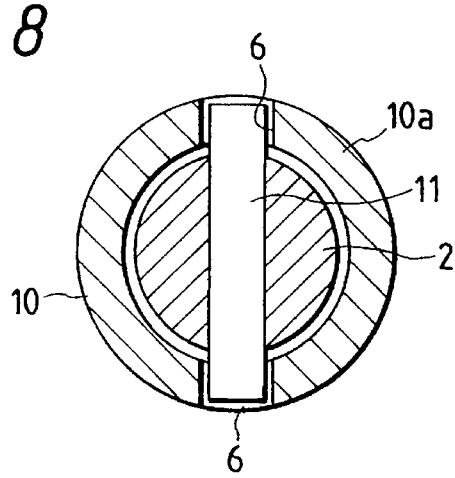
FIG. 8 is a sectional view taken along line 8—8 in FIG. 4.

FIG. 4 shows another example of the fishing double-bearing type reel, which constitutes a second embodiment of the invention. In the fishing double-bearing reel, the rod-shaped engaging piece 11 is fixedly secured to the end of the spool shaft 2 in such a manner that it is perpendicular to the spool shaft 2. FIG. 5 shows another example of the fishing double-bearing type reel, which constitutes a third embodiment of the invention. In the third embodiment, the supporting shaft 7 is rotatably supported but it is not axially movable; and the pinion 10 is mounted on the supporting shaft 7 in such a manner that it is axially movable and is rotated together with the latter 7. The third embodiment is advantageous in that the reel body can be short in axial length. FIG. 6 shows another example of the fishing double-bearing type reel, which constitutes a fourth embodiment of the invention. In the fishing double-bearing type reel, the supporting shaft 7 is fixedly secured to the reel side board 4 so that its rotation is inhibited, and the pinion 10 is mounted on the supporting shaft 7 in such a manner that it is axially movable and is rotatable. Similarly as in the case of the above-described third embodiment, in the fourth embodiment the reel body can be short in axial length.

In the fishing double-bearing type reel of the invention, the engaging region where the rod-shaped engaging piece and the recess are engaged with each other is located as close to the common axis of the spool shaft and the supporting shaft as possible. This feature substantially eliminates the occurrence of play, during the rotation of the reel, which is due to the gap formed in the engaging region. Hence, when feeling a bite, the fisherman can perform the hooking operation accurately and quickly.

In the reel of the invention, even when the pinion is made of a non-ferrous material such as aluminum alloy and copper alloy high in corrosion resistance, machinability, and engaging characteristic, the provision of the rod-shaped engaging piece on the pinion can maintain the clutch engaging section high in mechanical strength, to thereby make the clutch engaging section free from deformation and wear. Thus, the reel is durable enough to withstand the fishing line winding operation or the clutch engaging and disengaging operation which is carried out repeatedly for a long time. Furthermore, in the case where the rod-shaped engaging piece is provided on the spool shaft, the reel can be more readily manufactured, and assembled than in the case where it is provided on the pinion.

What is claimed is:

1. A fishing double-bearing type reel comprising:

a spool shaft rotatably supported by a reel body and having a spool thereon, said spool shaft having an axial end portion;

a supporting shaft coaxial with respect to said spool shaft, and having an axial end portion confronted with said axial end portion of said spool shaft;

a pinion rotatable in association with rotation of a handle and mounted on said supporting shaft;

a rod-shaped engaging piece provided on one of said axial end portions of said spool shaft and said pinion, and extending perpendicular to a common axis of said spool shaft and said supporting shaft; and a recess formed in the other of said axial end portions for engagement with said rod-shaped engaging piece, wherein said pinion is axially movable relative to said spool shaft so that said rod-shaped engaging piece is engaged with and disengaged from said recess, and wherein a spatial gap is provided between said spool shaft and said supporting shaft along said common axis to thereby permit relative axial displacement of said supporting shaft with respect to said spool shaft.

2. A fishing double-bearing type reel as claimed in claim 1, wherein:

said rod-shaped engaging piece is made of a hard steel, and provided on said pinion made of a non-ferrous material; and said recess is formed on said spool shaft.

3. A fishing double-bearing type reel as claimed in claim 2, wherein:

said hard steel is selected from the group consisting of stainless steel and quenched steel; and said non-ferrous material is selected from the group consisting of copper alloy and aluminum alloy.

4. A fishing double-bearing type reel as claimed in claim 1, wherein said rod-shaped engaging piece is made of a hard steel, and is provided on said spool shaft, and said recess is formed on said pinion made of a non-ferrous material.

5. A fishing double-bearing type reel as claimed in claim 4, wherein:

said hard steel is selected from the group consisting of stainless steel and quenched steel; and said non-ferrous material is selected from the group consisting of copper alloy and aluminum alloy.

6. A fishing double-bearing type reel as claimed in claim 1, wherein:

said pinion includes an annular wall at said axial end portion thereof for defining a circular hole into which said axial end portion of said spool shaft is insertable;

said rod-shaped engaging piece is supported by said annular wall and extends across said circular hole diametrically; and said recess is formed as a groove extending diametrically on said axial end of said spool shaft.

7. A fishing double-bearing type reel as claimed in claim 1, wherein:

said pinion includes an annular wall at said axial end portion thereof for defining a circular hole into which said axial end portion of said spool shaft is insertable;

said recess is formed as a pair of grooves located at diametrically opposite positions of said annular wall; and said rod-shaped engaging piece is fixed to said axial end of said spool shaft to diametrically protruded therefrom.

8. A fishing double-bearing type reel as claimed in claim 1, wherein said pinion is fixed to said supporting shaft to thereby translate with said support shaft along said common axis.

9. A fishing double-bearing type reel as claimed in claim 1, wherein said supporting shaft is mounted to rotate relative to said spool shaft.

10. A fishing double-bearing type reel comprising:

a spool shaft rotatably supported by a reel body and having a spool thereon, said spool shaft having an axial end portion;

a supporting shaft coaxial with respect to said spool shaft, and having an axial end portion confronted with said axial end portion of said spool shaft;

a pinion rotatable in association with rotation of a handle and rotatably mounted on said supporting shaft;

a rod-shaped engaging piece provided on one of said axial end portions of said spool shaft and said pinion, and extending perpendicular to a common axis of said spool shaft and said supporting shaft; and a recess formed in the other of said axial end portions for engagement with said rod-shaped engaging piece, wherein said pinion is axially movable relative to said spool shaft so that said rod-shaped engaging piece is engaged with and disengaged from said recess, and wherein said supporting shaft is completely disengaged from said spool shaft when said rod-shaped engaging piece is disengaged from said recess.

11. A fishing double-bearing type reel as claimed in claim 10, wherein a spatial gap separates said support shaft from said spool shaft along said common axis.

* * * * *